June 26, 1951 R. F. WALZ 2,558,637
FLASH BACK INDICATOR
Filed April 12, 1949
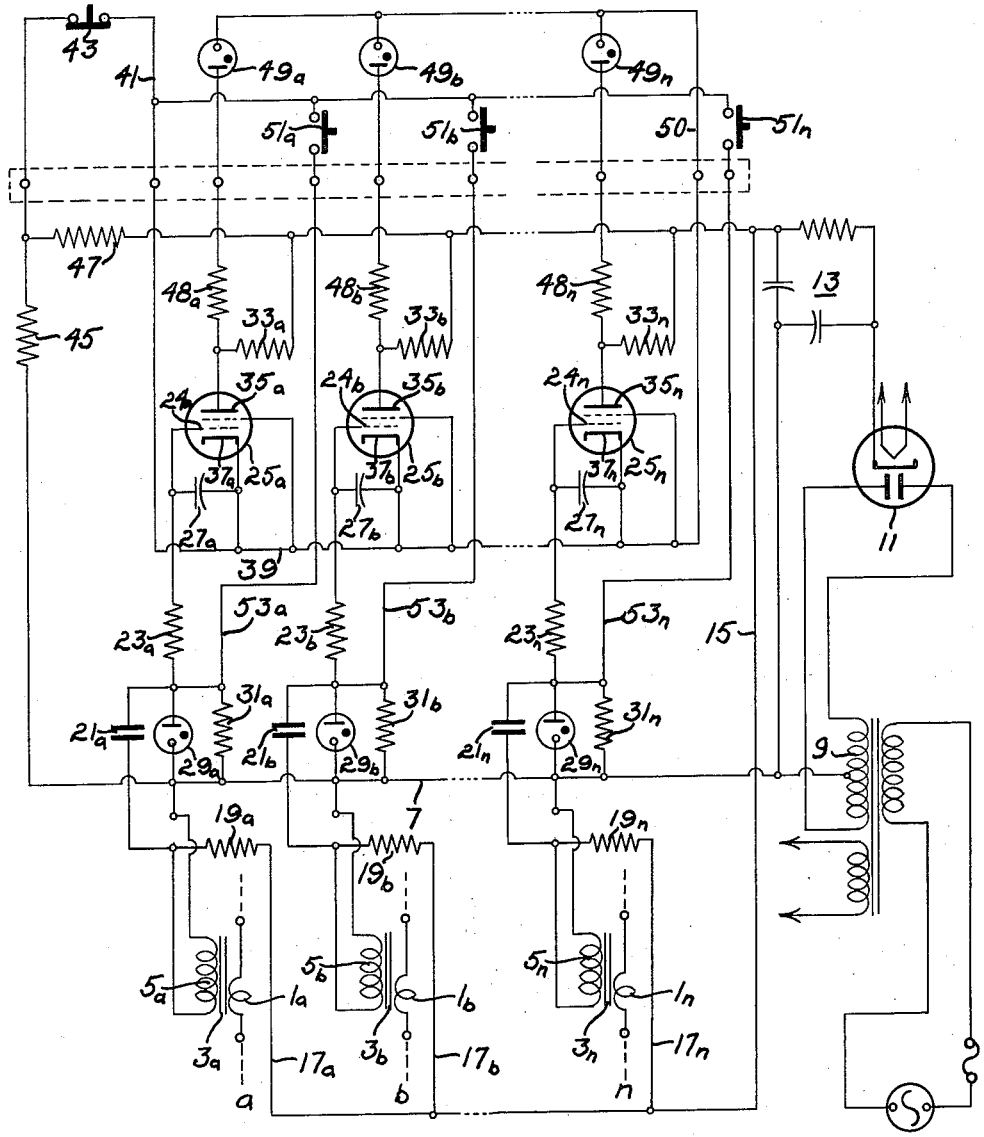
*INVENTOR,*
*RICHARD F. WALZ.*
BY
*Lippincott & Smith*
*ATTORNEYS.*

Patented June 26, 1951

2,558,637

UNITED STATES PATENT OFFICE 2,558,637

FLASH-BACK INDICATOR

Richard F. Walz, Manhattan Beach, Calif., assignor to The Walkirt Company, Culver City, Calif., a partnership Application April 12, 1949, Serial No. 86,901

3 Claims. (Cl. 177—311)

This invention relates to reverse current indicators, and while applicable to such indicators as used in any polyphase or parallel circuits wherein the occurrence of reverse current is undesirable or its indication important, it is particularly applicable to the indication of "arcback" in polyphase rectifier circuits of the vacuum tube or gaseous conduction tube type.

Such rectifier circuits are now used almost universally in supplying the direct current used in radio transmitters of all kinds, including commercial point-to-point and both sound and television broadcasting. In many cases the power requirements are rather large, and the tubes are expensive. The rectifiers are liable to failure, particularly when they become old, and the failure of any tube incapacitates the entire system until that tube is replaced. When one tube arcs back, so that its circuit carries current in the wrong direction, the transients consequent upon the event frequently cause other tubes to arc, and the whole occurrence takes place so rapidly that it is impossible to tell, without particular equipment for doing so, which tube has first failed. Unless the first arcback is due to some external and accidental cause, the rectifier tube wherein it occurred may be expected shortly to fail again in a similar manner, but the arcovers of the remaining tubes present no such implications.

In commercial broadcast service in particular the financial penalties for interruption of service may be very high, and where arcback occurs service is, of course, interrupted until the defective tube has been replaced. If the engineer in charge has no definite indication as to which tube is defective, he is confronted with the dilemma of whether to assume that it is the oldest tube which has gone and replace it, taking the chance that some other tube is guilty and running the risk of a further shut-down, or to replace the entire complement of tubes. Present prices of such tubes run over a hundred dollars apiece, and since six-phase circuits are usual, complete replacement may involve discarding five or six hundred dollars worth of good tubes. Nevertheless, the engineer may prefer to do this rather than take a chance of a greater penalty due to a second interruption.

The purpose of my invention is to provide a means for indicating the existence of reverse current in any branch of a parallel or polyphase rectifier circuit which will show positively the first branch in which such reverse current occurs, and will definitely prevent indication of failure of any other branch consequent upon such initial reverse current. Other objects and advantages inherent in my invention will not be set forth here, but will be understood and become apparent in connection with the detailed description which follows, supplemented by the drawing, wherein the single figure is a circuit diagram of a preferred form of the invention.

Referring to the drawing, the lines $a, b, \ldots n$, represent the parallel or polyphase rectifier lines wherein it is desired to indicate reverse current flow. For the purposes of this description it will be assumed that these lines represent the anode circuits of a polyphase group of rectifier tubes. Indicating equipment is provided for each line. These equipments are identical, and therefore only one of the indicating circuits will be described. In the drawings the reference characters referring to each indicating circuit are distinguished by subscripts corresponding to the rectifier line to which they appertain, while elements common to all circuits carry no subscript. In the written description, however, the subscripts will be omitted since any one of the three circuits actually shown may be followed.

In series with each line is the primary 1 of a current transformer 3. In the usual case this primary consists of a single turn of wire; in any case the number of turns used is small, and the step-up ratio to the secondary coil 5 of the transformer is high—5000 turns in some circuits which have been constructed, but this is not critical; the transformer is designed, in accordance with known principles, to give the desired secondary voltage.

One end of the secondary 5 connects to a negative bus 7, leading to the center tap on the secondary coil of a conventional power-pack transformer 9. The terminals of this coil connect to the anodes of a full-wave rectifier tube 11, the cathode of which connects through a conventional resistance-capacitance filter 13 to the positive bus 15 of the system.

Individual leads 17 connect from this bus through a current limiting resistor 19 back to the other side of the secondary coil 5. The resistor 19 is so adjusted that the current passed through the secondary coils is sufficient to magnetize the core of the transformer above the knee of its saturation curve. The connection of the primary 1 of the current transformer is such that the normal current in the corresponding rectifier line serves further to increase the magnetizing force, but since this force is already sufficient practically to saturate the core the pulses of rectified current flowing in the primary have very little effect on the total magnetic induction and, accordingly, result in practically no voltage appearing across the secondary coil. A reverse of current in the primary, however, will buck the direct magnetizing flux developed from the secondary coil, causing a sharp reduction in the magnetic induction and thereby producing a sharp voltage pulse at the terminals of the secondary 5. This pulse will be repeated in each cycle of the primary supply system in case of an arcback in a rectifier. In certain types of circuit only a single pulse may occur, but this is all that is necessary to trigger the indicating circuit next to be described.

A condenser 21 connects from the side of the winding 5 which also connects to the positive bus. The other side of condenser 21 connects through a grid resistor 23 to the control electrode 24 of a gaseous conduction tube 25 of the grid-glow type. For the purpose of stabilizing the circuit a small condenser 27 (perhaps 50 mmf. as compared to 0.1 mf. for condenser 21) may be connected between the control electrode 24 and the cathode of tube 25.

I prefer to use for the tubes 25 those wherein the grid is normally negative, and the tube will carry current when the grid potential approaches that of the cathode. As will become apparent, however, tubes may be used wherein the control electrode is positive, provided minor changes are made in the circuit to provide the proper biases.

Connected from the junction of condenser 21 and resistor 23 to the negative bus 7 is a gas diode 29, shunted by a high resistance (of the order of a megohm) 31. This resistor serves as a discharge path for charges collected by the grid 24, but is of such high impedance that it reduces only slightly the amplitude of pulses passed to the grid from the transformer 5 through condenser 21. The gas diode 29 has no effect on these pulses until they exceed a certain definite value, depending upon the tube chosen, but when this value is exceeded it breaks down, and becomes substantially a short circuit, and thus limits the value of the pulse imposed on the control electrode 24. It will be seen, therefore, that a reverse current flowing in one of the rectifier lines will impose a positive trigger impulse upon the grid 24, but that this pulse can under no circumstances exceed a certain predetermined value.

Turning now to the main discharge circuit of any one of the tubes 25, it can be traced from the positive bus 15 through an individual anode resistor 33 to the anode 35, and thence, from the cathode 37 to a cathode bus 39 connecting to all of the cathodes. From the bus 39 a lead 41 extends to a reset switch 43, normally closed, and thence, through a common cathode resistor 45, back to the negative bus 7. The common cathode resistor 45, and the individual anode resistors 33 should be of approximately the same value, say 5,000 ohms. It will be seen that the effect of current from the power supply through the resistor 45 is to swing the cathodes of all of the tubes 25 positive with respect to the control electrode when current flows therein. As normally none of these tubes is supposed to carry current, a slight positive bias is imposed on all of the cathodes by a drop in resistor 45 secured by connecting a resistor 47 from the positive bus 15 to the positive end of the resistor. This bias should be sufficient to prevent firing of any of the tubes 25 when the rectifier is functioning properly. The bias required is only slightly greater than the direct potential needed to prevent the tubes from firing since the pulses developed by variation of the currents in the primaries 1 are very small as long as these currents are in the normal direction.

A reverse current in any one of the primaries 1, however, will be sufficient to fire the corresponding tube 25, and convert it from an effective open circuit to an effective dead short between its resistor 33 and resistor 45. A drop equal to substantially one-half of the voltage of the power supply therefore appears across resistor 45, biasing all of the cathodes 37 positive by this amount, which corresponds to an equivalent negative bias on the grids 24. The diodes 29 are so chosen that they will fire when a positive potential materially less than this value is applied across them. Accordingly, if an arcback occurs in any line other than the one first affected, the positive pulse generated in the respective transformer 5 will fire the tube 29 and effectively short circuit the pulse before it can swing the grid nearly as far positive as the cathodes have been biased by the tube which is discharging.

Indicating means are provided for each of the tubes 25 to show it when it has fired and thus indicate reverse current in the rectifier line. This indicating means comprises a circuit including a ballast resistor 48 connected in series with a neon indicator lamp 49 connected from the plate 35 through a lead 50, back to the cathode bus 39; i. e., the indicator circuit is effectively connected in shunt with its corresponding tube. Since the current drawn by these indicator lamps is very small indeed, each of them is effectively connected across the entire voltage of the power supply until the tube to which it is connected has fired, whereupon the voltage across the indicator lamp drops nearly to zero, extinguishing the indicator. These indicator lamps have substantially constant voltage characteristics, and the amount of current which they carry is regulated by the drop through their ballast resistors 48. Although this drop is fairly large in comparison with the drop through resistor 45 when the latter is carrying current from any one of the tubes 25, it does not reduce the voltage across the indicator tubes to nearly the extent that is occasioned by the firing of a tube 25, and although when one tube has fired and its indicator lamp has extinguished the brilliancy of the others will be slightly decreased, the decrease is small, and there is no uncertainty whatever as to which tube has fired, thus indicating with absolute certainty the line in which failure has first occurred.

As is well known, it is a characteristic of grid-glow tubes, when supplied by direct current, that when discharge once occurs it continues until the anode voltage is removed or reduced to a very low value. To reset the device, therefore, the switch 43 is opened momentarily, breaking the cathode circuits of all of the tubes and reestablishing normal conditions to the entire device.

In any device of this character it is desirable that means should be provided for periodical testing of the circuit to insure that it is always in proper condition. A test circuit is therefore provided for each of the tubes 25, comprising, in this case, a normally open switch 51 connecting from the cathode bus 39 through a lead 53 to the junction between resistor 23 and the gas diode 29. Closing this switch puts cathode potential upon the grid of the corresponding tube 25, and, since this tube is in this case of the normally negative-grid type, will cause the tube to fire and give its indication without failure on the corresponding rectifier line. In case a normally positive grid type tube were used, a similar testing circuit could be connected to a more positive point.

I am aware that the firing of grid-glow tubes has been used in the past to give reverse current indications in circuits superficially similar to that here described. In the past, however, rectifiers have been used across the triggering circuits to provide the unidirectional characteristics necessary. If critically adjusted this expedient may work under normal conditions, particularly if there is filtering in the rectifier lines ahead of the indicator transformers. Positive pulses are, however, developed in a circuit of this type not only when reverse current occurs, but also during the portion of the direct cycle when the current is decreasing, and in order to prevent firing by this normal decrease, the adjustment must be very critically made. Even so, anomalies of operation not involving reverse current or tube failure, such as a short causing excess forward current, may cause a false indication, which is nearly as disastrous as no indication when a failure does occur. The use of a saturated transformer, however, absolutely prevents false indication of this character. Furthermore, in the former devices of which I am aware, the mere reduction of voltages on the tubes which have not fired is relied upon to prevent their indicating when successive flash-overs occur in other branches of the rectifier circuit, whereas in my organization of equipment, a positive hold-off voltage is applied which exceeds any pulse which can possibly be applied to the control grids of the other tubes.

I claim:

1. In a reverse current indicator comprising a plurality of grid-glow tubes each having a cathode, an anode and a control electrode and each associated with a separate conductor wherein reversal of current is to be indicated, and separate indicating means connected to each tube and actuated by discharge therethrough, triggering and lockout means for each of said grid-glow tubes comprising a cathode resistor connected to all of said tubes in common to provide a voltage drop biasing all of the cathodes of said tubes positive when any of said tubes discharges, a separate saturable core transformer adapted for connection in each of said conductors, means for magnetically saturating the cores of said transformers in the polarity produced by normal current flow in said conductors, connections from said transformers to the respective control electrodes of said grid-glow tubes to produce a positive pulse thereon upon desaturation of said transformers, and means for limiting the voltage of said pulse to a value less than the drop across said common resistor when any of said tubes is discharging.

2. Triggering and lockout means in accordance with the next preceding claim wherein said voltage limiting means comprises a gaseous conduction tube connected across the output connections of said transformer.

3. Triggering and lockout means in accordance with the second preceding claim wherein said voltage limiting means comprises a condenser and a gaseous conduction tube in series connected across the output connections of said transformer, whereby said gaseous conduction tube serves to limit the amplitude of pulses applied by said transformer but is without effect on continuous potentials.

RICHARD F. WALZ.

REFERENCES CITED

The following references are of record in the file of this patent:

UNITED STATES PATENTS

| Number | Name | Date |
|---|---|---|
| 2,057,531 | Livingston | Oct. 13, 1937 |
| 2,141,927 | Morack | Dec. 27, 1938 |
| 2,405,397 | Bedford | Aug. 6, 1946 |